C. M. CONRADSON.
VARIABLE SPEED GEARING.
APPLICATION FILED MAY 8, 1916.
1,216,775.
Patented Feb. 20, 1917.
4 SHEETS—SHEET 4.
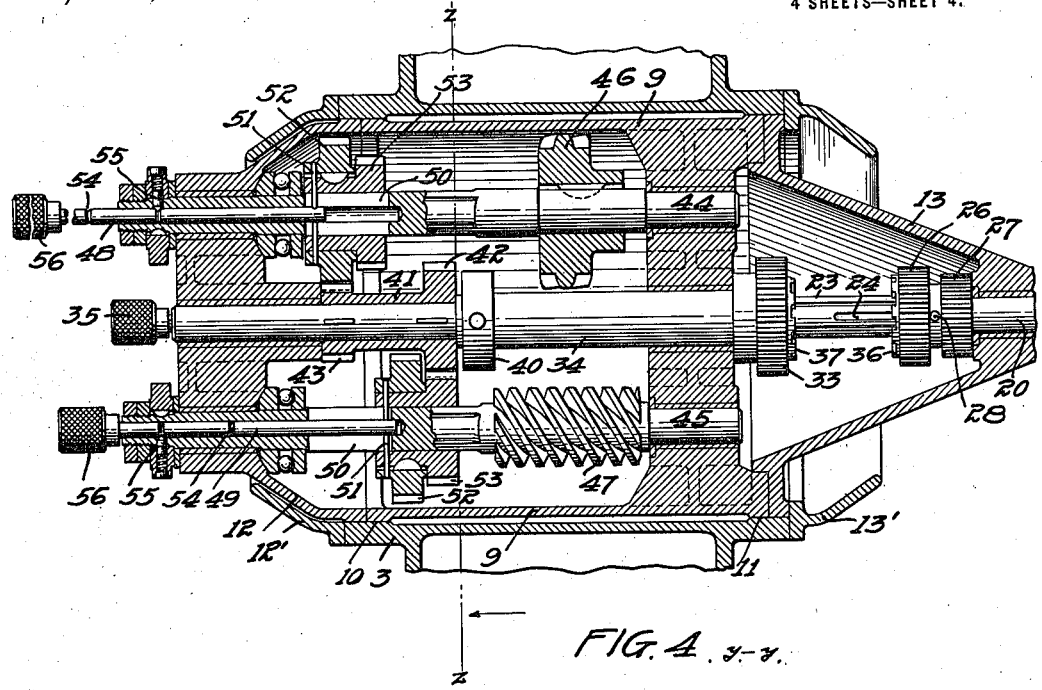
FIG. 4. y-y.
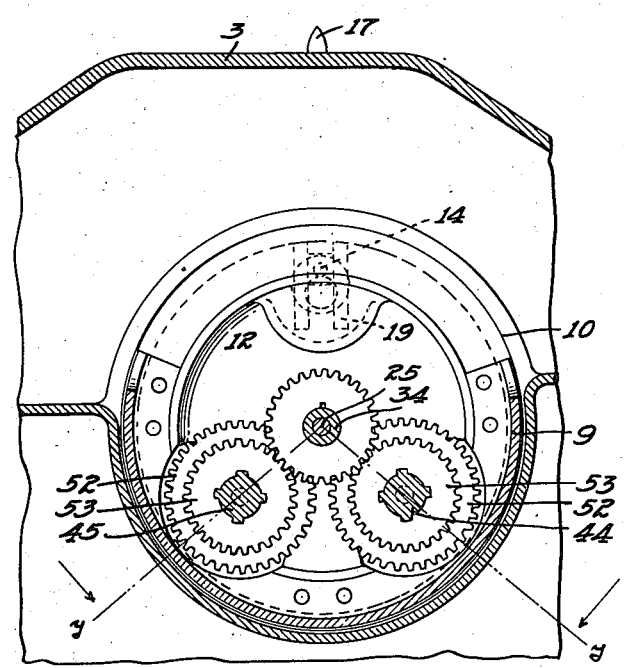
FIG. 5. z-z.
WITNESSES
INVENTOR
CONRAD M. CONRADSON
BY
ATTORNEYS

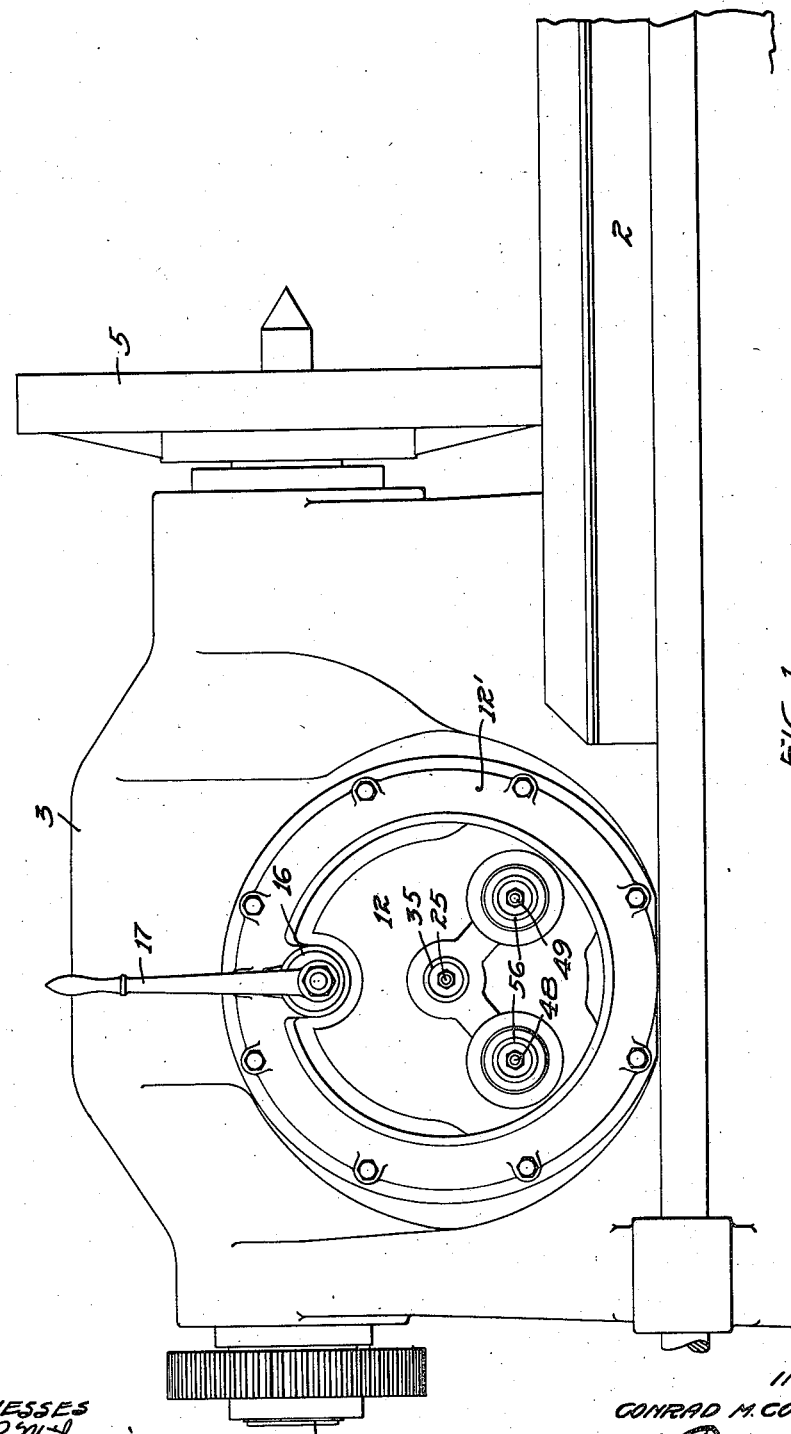

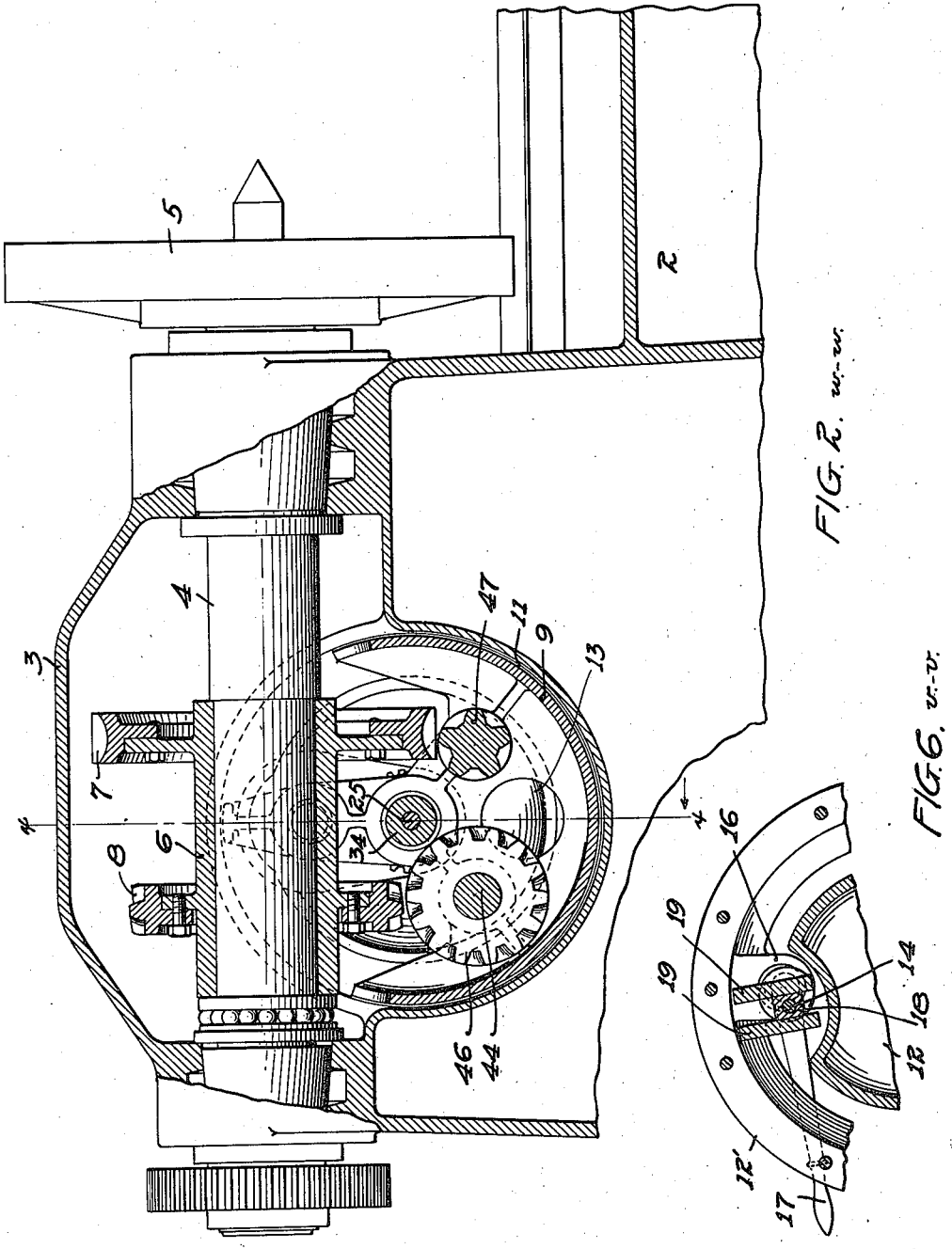

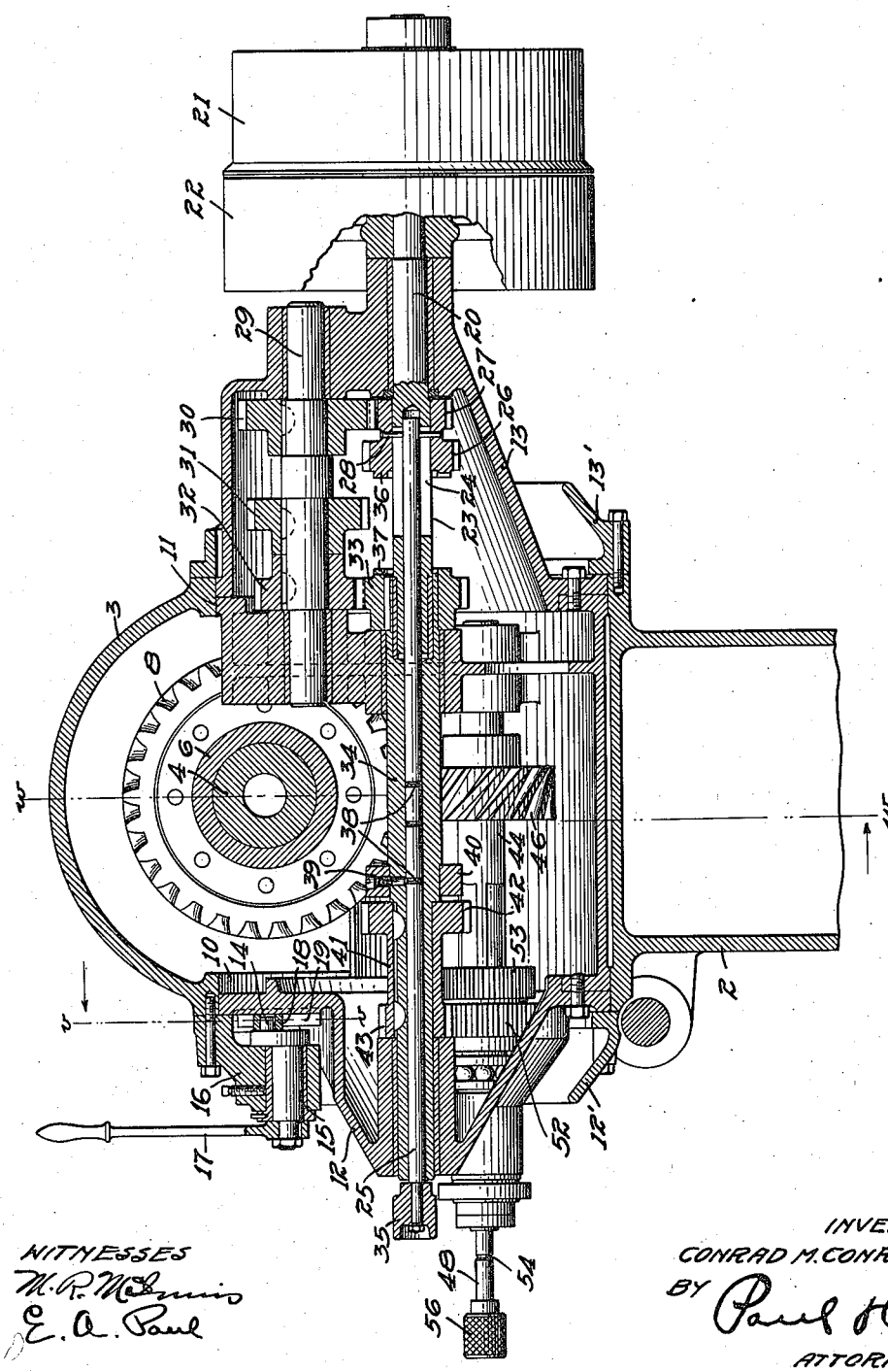

UNITED STATES PATENT OFFICE.

CONRAD M. CONRADSON, OF MADISON, WISCONSIN.

VARIABLE-SPEED GEARING.

1,216,775.  Specification of Letters Patent.  Patented Feb. 20, 1917.

Application filed May 8, 1916. Serial No. 96,073.

*To all whom it may concern:*

Be it known that I, CONRAD M. CONRADSON, citizen of the United States, resident of Madison, county of Dane, State of Wisconsin, have invented certain new and useful Improvements in Variable-Speed Gearing, of which the following is a specification.

The object of my invention is to provide a mechanism for driving various forms of machine tools having a rotating spindle used either for work-holding or tool-holding purposes. The device can be used to advantage for driving engine, turret and pulley lathes, screw and milling machines and also for driving boring, drilling and threading machines, etc.

The use of a worm and a wheel for driving a machine tool spindle is not broadly new. Many machines of various types have been built in which a single worm and wheel for driving the spindle have been employed. Such a driving mechanism, however, has not been generally adopted on account of the limitations in speed incidental to the use of a single worm and wheel. To obtain power for heavy cuts, the speed ratio of the worm to the wheel must be large, say one to ten, one to fifteen or one to twenty. In this way it is possible to get any desired driving power at the point of the cutting tool.

It is necessary, however, that an engine lathe or other machine tool must be built to handle work of widely varying diameters of tools in case the spindle is adapted for carrying a tool. For instance, a twenty inch lathe may be used to turn a piece of work twenty inches in diameter at a given cutting speed, and it may be desired to turn or bore a diameter of one inch as a minimum. Necessarily this involves a speed range of twenty to one in order to maintain uniform cutting speed, which is very desirable for efficiency of operation.

It would be practically impossible, with a single worm and wheel, to obtain this range. Suppose, for instance, twenty feet per minute is the proper cutting speed and that the speed ratio of the worm to the worm wheel is fifteen to one and it is desired to turn a diameter of twenty inches and also a diameter of one inch with the same cutting speed. A piece of work twenty inches in diameter is approximately five feet in circumference and to obtain twenty feet cutting speed per minute the work should rotate four revolutions per minute. At the assumed ratio, with the spindle rotating 4 R. P. M., the worm would rotate 60 R. P. M., a perfectly practical speed, but for the one inch diameter the case would be different. A piece of work of this size is approximately three inches in circumference, and to obtain a cutting speed of twenty feet per minute should run eighty revolutions per minute. The ratio between the worm and gear being fifteen to one would make a speed of twelve hundred R. P. M. of the worm, which would be impracticable. This limitation has therefore prevented the use of the single worm and wheel in machine tool practice. It is only useful in special cases where a limited speed range is required.

In my invention I have overcome this difficulty completely by the use of the duplex helical drive, using preferably a worm and wheel for the slow speed and for the high speed a pair of spiral gears. The average lathe requires anywhere from eight to sixteen speeds, varying preferably by a constant multiplier known as the "speed ratio." In other words, the speeds are in approximate geometrical progression. In my invention, as will appear from the following detailed description, twelve speeds are obtainable, six by means of various combinations of sliding gears, which may be doubled by the duplex worm arrangement. The difference in ratio between the two worm drives corresponds with what is ordinarily called the "back gear ratio" in an engine lathe or milling machine. In my present case I have shown it in the ratio approximately of five to one; that is, for a given combination of gears the spindle on high speed will operate approximately five times as fast as on slow speed. Evidently this ratio can be for any desired amount. In the application of my invention to the lathe, as shown in the drawing, a greater range of speed is provided for than is really necessary in a lathe of this type.

My invention consists, therefore, in various constructions and combinations, all as hereinafter described and particularly pointed out in the claims.

In the accompanying drawings forming part of this specification,

Figure 1 is an elevation of one end of a lathe embodying my invention,

Fig. 2 is a sectional view on the line w—w of Fig. 3,

Fig. 3 is a sectional view on the line x—x of Fig. 2,

Fig. 4 is a sectional view on the line y—y of Fig. 5,

Fig. 5 is a sectional view on the line z—z of Fig. 4,

Fig. 6 is a detail sectional view of the speed gear shifting lever, taken on the line v—v of Fig. 3.

I have shown my invention applied to the spindle of a lathe, but it will be understood that it may be adapted as a variable speed mechanism for other types of machines.

In the drawing, 2 represents the frame of a lathe and 3 a housing for the gear mechanism. 4 is a spindle for the chuck 5. 6 is a sleeve keyed on the spindle. 7 is a worm gear and 8 is a spiral gear, both secured on said sleeve.

Below the chuck spindle and the sleeve 6 is a carrier 9 having bearings at 10 and 11 in the walls of the housing. This carrier has cone-shaped heads 12 and 13 bolted thereto and a rocking movement on its bearings on an axis at right angles to the axis of the chuck spindle. For operating the carrier I provide a crank pin 14 having a bearing at 15 in a bracket 16 that is secured to the housing and operated by means of a lever 17. The crank pin has a block 18 thereon that is mounted to slide between wings 19 on the end of the carrier so that when the lever is operated the crank pin bearing on the wings 19 will rock the carrier back and forth in the housing. At each end of the carrier rings 12' and 13' are provided, which have converging walls and operate to retain the oil in the bearings. A short drive shaft 20, having loose and tight pulleys 21 and 22, has one of its bearings in the cone head 13 and has a part 23, rectangular in cross section, that is provided with a longitudinal slot 24. One end of the shaft 20, including the part 23, is centrally bored to receive a rod 25, and gears 26 and 27 are mounted to slide on the part 23 have their hub secured to the rod 25 by a pin 28 so that when the rod 25 is reciprocated, the gears 26 and 27 will be moved back and forth on the drive shaft. A counter shaft 29 is mounted in bearings parallel with the drive shaft and has gears 30, 31 and 32 secured thereon, the gear 30 being mounted to mesh with the gear 27 and the gear 31 to engage the teeth of the gear 26 when the rod 25 is moved to disengage the gears 27 and 30.

A gear 33 has a bearing on a shaft 34 centrally mounted in the carrier 9 concentric with the drive shaft and centrally bored to receive the rod 25 which projects through the head 12 of the carrier and is provided with a suitable finger grip 35 by means of which the lathe attendant can move the rod 25 longitudinally to shift the gears 26 and 27. The shaft 34 has a longitudinal socket in one end to receive the adjacent end of the shaft 20 concentric therewith.

The gear 26 has teeth 36 on one face thereof to engage similar teeth 37 on the face of the gear 33 for a direct drive, the gear 27 at that time being idle. The gear 26 has therefore two operative positions,—one in engagement with the gear 31 for indirect drive and the other in direct engagement with the gear 33 for a direct drive.

The rod 25 has a series of annular grooves 38 therein adapted to receive a spring-pressed pin 39 operating as an index to enable the attendant to determine the proper adjustment of this rod to obtain the desired speed of drive. This pin is mounted in the shaft 34 and a collar 40 that is secured on said shaft. A hub 41 is also mounted on the shaft 34 having gears 42 and 43 thereon. The rocking carrier also has shafts 44 and 45 journaled therein.

On the shaft 44 a spiral gear 46 is secured to mesh with the gear 8 and on the shaft 45 a worm 47 is secured to mesh with the worm gear 7. The rocking of the carrier 9 moves the gear 46 or the worm 47 into engagement with the gears 8 or 7 respectively or the gear 46 and the worm 47 may be in neutral position and not in engagement with either of the gears 8 or 7, depending upon the position of the operating lever 17. The worm 47 may be moved into engagement with its gear when a very slow speed is desired, and the gear 46 in engagement with the gear 8 when a higher speed is desired.

The mounting of the worm gears in the carrier or rocker 9 I regard as an important structural feature of the machine. It provides a very solid, substantial mount for the gears and one that is easily housed, so that the gears may run in oil, and permits a very stiff and strong structure for the framing of the lathe or other machine.

Each of the shafts 44 and 45 is centrally bored to receive rods 48 and 49 respectively and both of these shafts have longitudinal slots 50 therein wherein pins 51, which secure said rods to gears 52 and 53, are slidable, said gears being adapted to mesh respectively with the gears 43 and 42 according to the speed desired, there being two speed connections for both of the shafts 44 and 45 with the hub 41. Rods 48 and 49 have annular grooves 54 therein to receive spring-pressed pins 55 for indexing these rods and enabling the attendant to determine when the gears are properly adjusted. Each rod has a finger grip 56 thereon.

The manner above described of centrally boring the shafts to receive the gear shifting rods is not indispensable to this construction but is largely a matter of convenience. The gears may be operated by other shifting mechanism with equally good results.

There is a particular advantage in this construction derived from dividing the speed ratio between two sets of gears, one set in front of the axial line of the spindle and the other in the rear of the axial line, one set compounding with the other. This I have found is an extremely practical construction, as it balances up the machine and prevents the undesirable overhang that would result if all the gears were placed on one side of the spindle.

I do not wish to be confined to the shifting mechanism of this machine, as it may be varied to suit different conditions of use and installation, the essential feature being the duplex helical worm gears of different ratio and the helical drive gears mating therewith.

I claim as my invention:

1. The combination, with a spindle, and gears for low and high speed work secured thereon, of oscillating driving gears having a common axis of oscillation and mounted to mesh respectively and alternately with said spindle gears and means for varying the speed of said driving gears.

2. The combination, with a spindle and gears for low and high speed work secured thereon, of oscillating driving gears having a common axis of oscillation at right angles substantially to the axis of said spindle, said spindle gears being mounted to mesh respectively and alternately with said driving gears and means for varying the speed of said driving gears.

3. The combination, with a spindle and gears for low and high speed work secured thereon, of a rocking carrier having its axis at right angles substantially to the axis of said spindle, and driving gears mounted in said carrier to mesh respectively and alternately with said spindle gears and independent variable driving connections for said driving gears.

4. A variable speed gearing comprising a spindle, a pair of worm wheels thereon, and a pair of driving worms mounted to mesh respectively and alternately with said wheels, the speed ratio of one wheel to its worm being different from the speed ratio of the other wheel and its worm, whereby a difference in spindle speed may be obtained through the alternate engagement of said spindle worm wheels with said worms.

5. A variable speed gearing comprising a spindle, a pair of worm wheels thereon, a rocking carrier, and a pair of driving worms mounted in said carrier to mesh respectively and alternately with said wheels, the speed ratio of one wheel to its worm being different from the speed ratio of the other wheel to its worm, whereby a difference in spindle speed may be obtained through the alternate engagement of said spindle worm wheels with said worms.

6. A variable speed gearing comprising a spindle, worm wheels mounted thereon, worms of different speed ratio to said wheels mounted to mesh respectively therewith and means for varying the speed of said worms.

7. A variable speed gearing comprising a spindle, worm wheels mounted thereon, a rocking carrier, worms of different speed ratio to said wheels mounted in said carrier and adapted to mesh respectively and alternately with said wheels when said carrier is rocked, and means mounted in said carrier for varying the speed of said worms.

8. A variable speed gearing comprising a spindle, a pair of helical gears mounted thereon, a pair of shafts having a common axis of oscillation, worms mounted on said shafts for meshing alternately with said gears and means for varying the speed of said shafts.

9. A variable speed gearing comprising a spindle, helical gears mounted thereon, a pair of shafts, helical gears mounted on said shafts for meshing with the gears on said spindle, means for engaging the gears of said shafts respectively with those of said spindle alternately, and means for varying the speed of said shafts.

10. The combination, with a frame and a housing mounted thereon, of a spindle, a sleeve secured on said spindle, a worm gear and a spiral gear secured on said sleeve, a carrier mounted to rock on an axis at right angles to the axis of said spindle, shafts eccentrically mounted in said carrier, a spiral gear, and a worm secured respectively on each of said eccentrically mounted shafts, the rocking of said carrier engaging said spiral gear and worm gear respectively with the gears in said carrier.

11. The combination, with a frame, a spindle mounted therein and a worm gear and a spiral gear mounted on said spindle, of a rocking carrier having its axis of oscillation at right angles substantially to said spindle, a drive shaft concentrically mounted in said carrier, shafts eccentrically mounted in said carrier parallel with said drive shaft, worm and spiral gears mounted on said eccentrically mounted shafts for meshing alternately and respectively with the gears of said spindle, and a variable speed driving mechanism between said driving shaft and said eccentrically mounted shafts.

12. The combination, with a frame and a spindle mounted therein, of a rocking carrier having its axis of oscillation at right angles substantially to said spindle, a driving shaft concentric with said carrier, shafts eccentrically mounted in said carrier, variable speed duplex worm gearing mounted for connecting said eccentrically mounted shafts alternately with said spindle, and a driving connection between said driving shaft and said eccentrically mounted shafts.

13. The combination, with a lathe frame and a chuck spindle mounted therein, of a rocking carrier having its axis of oscillation at right angles substantially to said spindle, a driving shaft concentric with the axis of said carrier, variable speed gearing comprising gears mounted on said spindle, and mating gears having bearings in said carrier eccentric with respect to the axis thereof, whereby the rocking of said carrier will engage one or the other of its gears with the mating gear of said spindle, and a variable speed driving connection between said driving shaft and the gears of said carrier.

14. The combination, with a lathe frame and a chuck spindle mounted therein, of a rocking carrier having its axis of oscillation at right angles substantially to said spindle, a driving shaft concentric with the axis of said carrier, variable speed gearing comprising gears mounted on said spindle and mating gears having bearings in said carrier eccentric with respect to the axis thereof, whereby the rocking of said carrier will engage one or the other of its gears with the mating gear of said spindle, a variable speed driving connection between said driving shaft and the gears of said carrier, and a shifting device for said driving connection concentric with the axis of said carrier.

15. The combination, with a lathe frame, of a chuck spindle mounted therein, a cylindrical carrier having substantially cone-shaped heads and mounted for oscillation on an axis at right angles substantially to said spindle, a driving shaft concentric with said carrier, gears mounted eccentrically in said carrier and gears mounted on said spindle for meshing respectively and alternately with the gears of said carrier, and a driving connection between said driving shaft and the gears of said carrier.

16. The combination, with a frame and a housing mounted thereon, of a spindle, a rocking carrier having its axis of oscillation at right angles substantially to the axis of said spindle, a driving shaft, shafts eccentrically mounted in said carrier and having variable speed driving connections with said driving shaft, a worm wheel and a worm mounted respectively on said spindle and one of said eccentric shafts for slow speed, a pair of spiral gears mounted respectively on said spindle and the other eccentric shaft for high speed, and means for rocking said carrier for engaging said slow and high speed gears alternately.

17. The combination, with a frame, of a spindle journaled therein, a rocking carrier having its axis of oscillation at right angles substantially to the axis of said spindle, a driving shaft concentric with said carrier, shafts eccentrically mounted in said carrier, driving connections for said eccentric shafts with said driving shafts, and duplex helical driving gears mounted on said spindle and on said eccentric shafts respectively, the gear of one shaft meshing with the gear on said spindle for slow speed when said carrier is rocked in one direction, and the gear of the other shaft meshing with the other gear on said spindle for high speed when said carrier is rocked in the other direction.

18. The combination, with a frame of a spindle mounted therein, a rocking carrier having its axis of oscillation at right angles to the axis of said spindle, a driving shaft concentric with said carrier, shafts eccentrically mounted in said carrier, independent variable speed driving connections for said eccentrically mounted shafts, with said driving shaft, whereby either eccentric shaft can be operated at variable speeds independently of the other eccentric shaft, and gears for high and low speed work mounted respectively on said eccentric shafts and on said spindle, the rocking of said carrier in one direction meshing the slow speed gears of said spindle and one of said shafts and the rocking of said carrier in the other direction meshing the high speed gear on said spindle and the gear of said other shaft.

19. The combination, with a frame, of a spindle mounted therein, a rocking carrier having its axis of oscillation at right angles to the axis of said spindle, a driven shaft concentrically mounted in said carrier, a driving shaft, a direct driving connection for said driven shaft and an indirect variable speed driving connection for said driven shaft, shafts eccentrically mounted in said carrier, independent variable speed driving connections for said eccentrically mounted shafts with said driven shaft, gears mounted on said spindle and said eccentric shafts for slow and high speed, the rocking of said carrier in one direction engaging the slow speed gears of said spindle and one of said eccentric shafts, and the rocking of said carrier in the other direction engaging the high speed gears of said spindle and the other eccentric shaft.

20. The combination with a spindle, of a rocking carrier having its axis of oscillation at right angles to the axis of said spindle, a driven shaft concentric with said carrier, a driving shaft therefor, shafts eccentrically mounted in said carrier, independent variable speed driving connections for said driven shaft, and slow and high speed gears mounted on said spindle and on said eccentrically mounted shafts respectively, the rocking of said carrier in one direction engaging one pair of gears for slow speed and the rocking of said carrier in the other direction engaging the other pair of gears for high speed.

21. The combination, with a frame, of a spindle mounted therein, a rocking cylindrical carrier having its axis of oscillation transversely of said spindle, shafts eccentrically mounted in said carrier, a driving shaft independent variable speed driving connections for said eccentrically mounted shafts and gears for slow and high speed mounted on said spindle and said eccentrically mounted shafts respectively, the rocking of said carrier in one direction meshing the slow speed gears of said spindle and one shaft and the rocking of the carrier in the other direction meshing the high speed gears of said spindle and said other shaft.

22. The combination, with a frame and a spindle mounted therein, of a rocking carrier having its axis of oscillation transversely of said spindle, a pair of gears for slow speed, one connected with said spindle external to said carrier and the other eccentrically mounted in said carrier, a second pair of gears for high speed correspondingly arranged with respect to said spindle and carrier, means for rocking said carrier to engage either its slow or high speed gear with the mating gear of said spindle, a driving shaft, and driving connections for the gears of said carrier.

23. The combination, with a frame and a spindle mounted therein, of a rocking carrier having its axis of oscillation transversely of said spindle, a pair of gears for slow speed, one connected with said spindle external to said carrier and the other eccentrically mounted in said carrier, a second pair of gears for high speed correspondingly arranged with respect to said spindle and carrier, means for rocking said carrier to engage either its slow or high speed gear with the mating gear of said spindle, a driving shaft and independent variable speed driving connections for the gears of said carrier.

24. The combination, with a frame, and a spindle mounted therein, of a rocking carrier having its axis of oscillation transversely of said spindle, a pair of gears for slow speed, one connected with said spindle external to said carrier and the other eccentrically mounted in said carrier, a second pair of gears for high speed correspondingly arranged with respect to said spindle and carrier, means for rocking said carrier to engage either its slow or high speed gear with the mating gear of said spindle, a driven shaft concentric with said carrier, a driving shaft geared to said driven shaft, and independent variable speed driving connections between said driven shaft and the slow and high speed gears of said carrier.

25. The combination, with a frame and a spindle mounted therein, of a rocking carrier having its axis of oscillation transversely of said spindle, a pair of gears for slow speed, one connected with said spindle external to said carrier and the other eccentrically mounted in said carrier, a second pair of gears for high speed correspondingly arranged with respect to said spindle and carrier, means for rocking said carrier to engage either its slow or high speed gear with the mating gear of said spindle, and means for locking said carrier at the limit of its rocking movement in either direction.

In witness whereof, I have hereunto set my hand this 4th day of May, 1916.

CONRAD M. CONRADSON.